(12) United States Patent
Brown (10) Patent No.: US 8,365,460 B2
(45) Date of Patent: Feb. 5, 2013

(54) FISHING LINE CUTTER

(76) Inventor: Vic Brown, Omaha, NE (US)

( * ) Notice: Subject to any disclaimer, the term of this patent is extended or adjusted under 35 U.S.C. 154(b) by 277 days.

(21) Appl. No.: 12/806,306

(22) Filed: Aug. 10, 2010

(65) Prior Publication Data

US 2012/0036761 A1    Feb. 16, 2012

(51) Int. Cl.
*A01K 91/03* (2006.01)
*A01K 91/06* (2006.01)
*A01K 97/24* (2006.01)

(52) U.S. Cl. .................. 43/43.12; 43/17.2; 114/221 A (58) Field of Classification Search .............. 43/17.2, 43/43.12, 43.13, 4; 114/221 A; 441/2, 21
See application file for complete search history.

(56) References Cited

U.S. PATENT DOCUMENTS

| | | | |
|---|---|---|---|
| 488,847 A | 12/1892 | Squires et al. | |
| 756,760 A | 4/1904 | Wolf | |
| 893,173 A | 7/1908 | Kunze | |
| 2,396,731 A * | 3/1946 | Wiener | 114/221 A |
| 2,593,716 A | 4/1952 | Allen | |
| 2,968,112 A * | 1/1961 | McClure | 43/17.2 |
| 3,616,717 A * | 11/1971 | Jones, Jr. | 83/39 |
| 3,802,110 A * | 4/1974 | Guillemain | 43/17.2 |
| 4,660,314 A * | 4/1987 | Janssen et al. | 289/17 |
| 4,908,974 A * | 3/1990 | Orlick et al. | 43/17.2 |
| 5,283,920 A * | 2/1994 | Plummer | 7/106 |
| 6,038,807 A | 3/2000 | Taylor | |
| 6,061,858 A * | 5/2000 | Shepard | 7/106 |
| 2004/0177545 A1* | 9/2004 | Yonenoi | 43/4 |
| 2006/0179707 A1* | 8/2006 | Brinker et al. | 43/43.12 |
| 2007/0119091 A1* | 5/2007 | Osborn et al. | 43/43.12 |

* cited by examiner

*Primary Examiner* — Darren W Ark
*Assistant Examiner* — Lisa Tsang
(74) *Attorney, Agent, or Firm* — Dennis L. Thomte; Thomte Patent Law Office LLC (57) ABSTRACT

A fishing line cutter which is adapted to cut a fishing line closely adjacent the hook at the end of the fishing line. The fishing line may be inserted into the line cutter without any disassembly of the line cutter.

11 Claims, 9 Drawing Sheets

FISHING LINE CUTTER

BACKGROUND OF THE INVENTION

1. Field of the Invention

This invention relates to a fishing line cutter and more particularly to a fishing line cutter which is ideally suited for use with drop lines which extend downwardly from a main line in a trotline fishing rig.

2. Description of the Related Art

One type of commercial fishing is known as trotline fishing. In most trotline fishing operations, a main line is set out and is supported by floats along the length thereof which may be more than a mile long. A plurality of horizontally spaced-apart drop lines are attached to the main line along the length thereof which have a baited hook secured to the lower end thereof.

After a period of time, the main line is pulled toward the fishing boat by a winch or the like. As each drop line reaches the boat, the fish, if any, which have struck the hook on the drop line, are removed from the hook and deposited in a compartment in the boat. As each drop line is reached, it is detached from the main line and stored separately from the main line.

A problem in the above method arises if a protected fish such as a dolphin or the like or a protected species such as a turtle or the like has been hooked. It has been found that it is less harmful to the protected fish or species to leave the hook in the mouth of the fish or turtle rather than try to remove the hook and then release the fish or turtle. The fishing line attached to the hook is usually cut so that the fish or turtle may be released with the hook in its mouth. After a period of time, the hook in the mouth of the fish or turtle will deteriorate and will become detached from the fish or turtle. If a long length of fishing line is left attached to the hook, the fishing line may become entangled or ensnarled around the mouth and/or body of the fish or turtle thereby endangering the life thereof.

Many fishing line cutters have been previously provided but they are believed to be inefficient, difficult to use and cumbersome.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A fishing line cutter is disclosed which comprises an oval-shaped first side plate having an upper end, a lower end, a first side edge, a second side edge, an inner surface and an outer surface. An upper line guide is secured to the first side plate at the inner surface thereof adjacent the upper end thereof. A lower line guide is secured to the first side plate at the inner surface thereof adjacent the lower end thereof. The first side plate has a plurality of vertically and horizontally spaced-apart spacers secured thereto which extend inwardly from the inner surface thereof. An anvil is secured to the first side plate at the inner surface thereof between the upper and lower ends thereof. An actuator lever, having upper and lower ends, is also provided with the actuator lever having a cutting blade secured to the upper end thereof. The actuator lever is pivotally secured, intermediate its upper and lower ends, to the first side plate at the inner surface thereof above the lower end thereof. The actuator lever is selectively pivotally movable between a first non-cutting position towards a second cutting position whereby the cutting blade will pass beneath the anvil as it is moved from its first position towards the second position.

The fishing line cutter of this invention also includes a vertically disposed side plate assembly, having upper and lower ends, which is secured to the first side plate in a spaced-apart relationship thereto. The side plate assembly is secured to the spacers and the upper and lower line guides. The actuator lever is mounted on one of the spacers extending between the first side plate and the side plate assembly so that the lever is pivotally mounted thereon. The side plate assembly is comprised of a plurality of generally triangular-shaped side plate members which are spaced-apart from one another to permit the fishing line to be cut to be initially inserted between the first side plate and the side plate assembly without disassembling either the first side plate or the second side plate assembly and without cutting the fishing line while inserting the fishing line between the first side plate and the side plate assembly.

If a fishing line is to be cut, the fishing line is threaded into the line cutter by passing the same between the side plate members of the side plate assembly. A tag line is secured to the lower end of the actuating lever and the line cutter is lowered on the line to be cut until the line cutter is positioned closely adjacent the hook of the fishing line. The tag line is then pulled upwardly which causes the actuator lever to pivotally move from its first non-cutting position towards its second cutting position. As the cutting blade of the actuator lever passes in close proximity to the anvil, the blade on the actuator lever severs the fishing line. The fishing line cutter is then pulled upwardly from the water by means of the tag line.

It is therefore a principal object of the invention to provide an improved fishing line cutter.

A further object of the invention is to provide a fishing line cutter which enables the line to be cut closely adjacent the hook of the fishing line.

A further object of the invention is to provide a fishing line cutter wherein the line to be cut may be inserted into the fishing line cutter without disassembling the fishing line cutter or without cutting the line to be cut.

A further object of the invention is to provide a fishing line cutter which is easy and efficient to use.

A further object of the invention is to provide a fishing line cutter of the type described which is durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
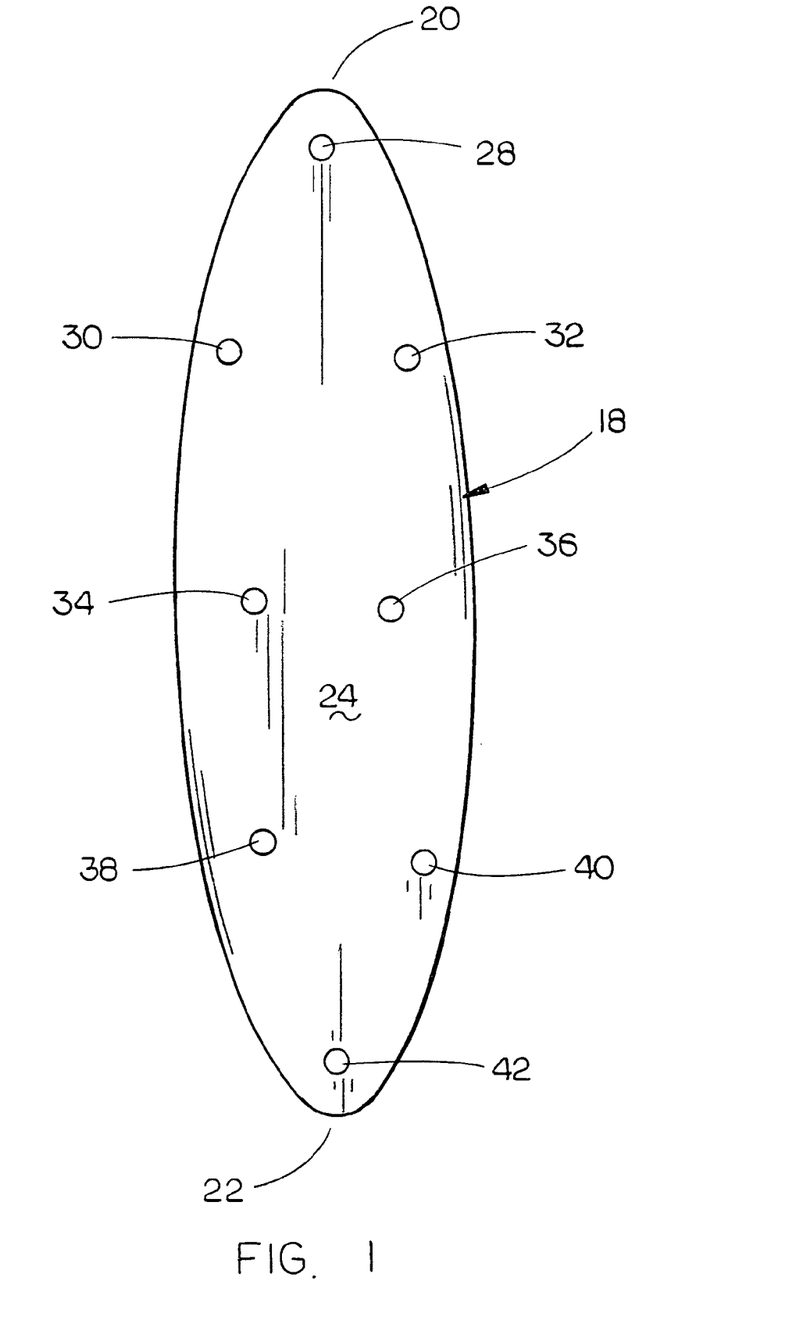
FIG. 1 is a side view of the first side plate of the fishing line cutter.
Figure 2:
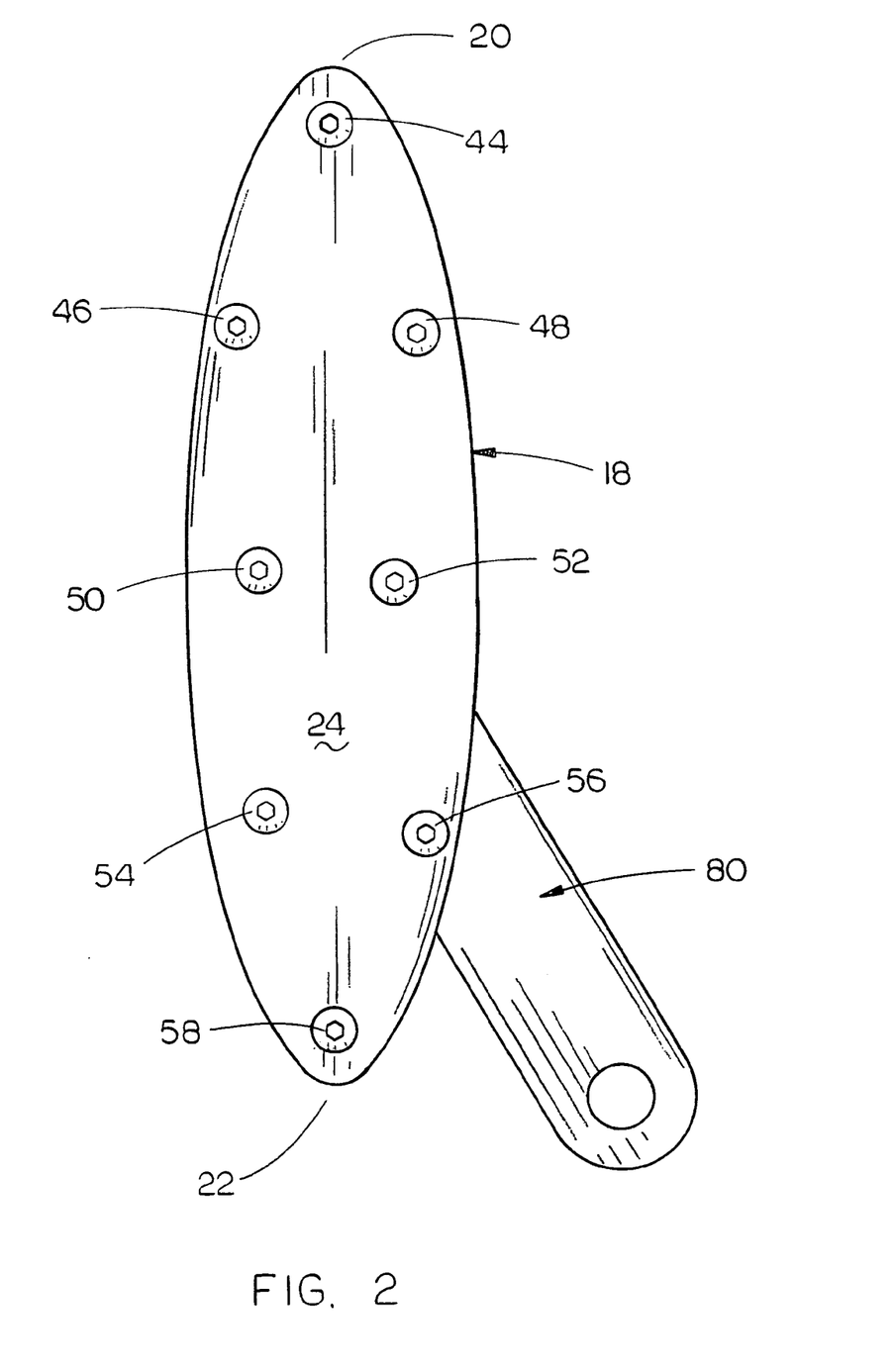
FIG. 2 is a view similar to FIG. 1 except that screws have been extended through the first side plate with the actuator lever being shown in its non-cutting position.

The fishing line cutter of this invention is referred to generally by the reference numeral 10 while the fishing line to be cut is referred to by the reference numeral 12. For ease of description, the line cutter 10 will be described as it is used, i.e., an upper end 14 and a lower end 16. Line cutter 10 includes a first flat side plate 18 which is preferably constructed of a stainless steel material and which is generally oval in shape with an upper end 20, lower end 22, and outer side 24 and an inner side 26. Side plate 18 includes a plurality of openings formed therein which are identified by the reference numerals 28, 30, 32, 34, 36, 38, 40 and 42. The numerals 44, 46, 48, 50, 52, 54, 56 and 58 refers to screws which extend inwardly through openings 28, 30, 32, 34, 36, 40 and 42 respectively.

Figure 3:
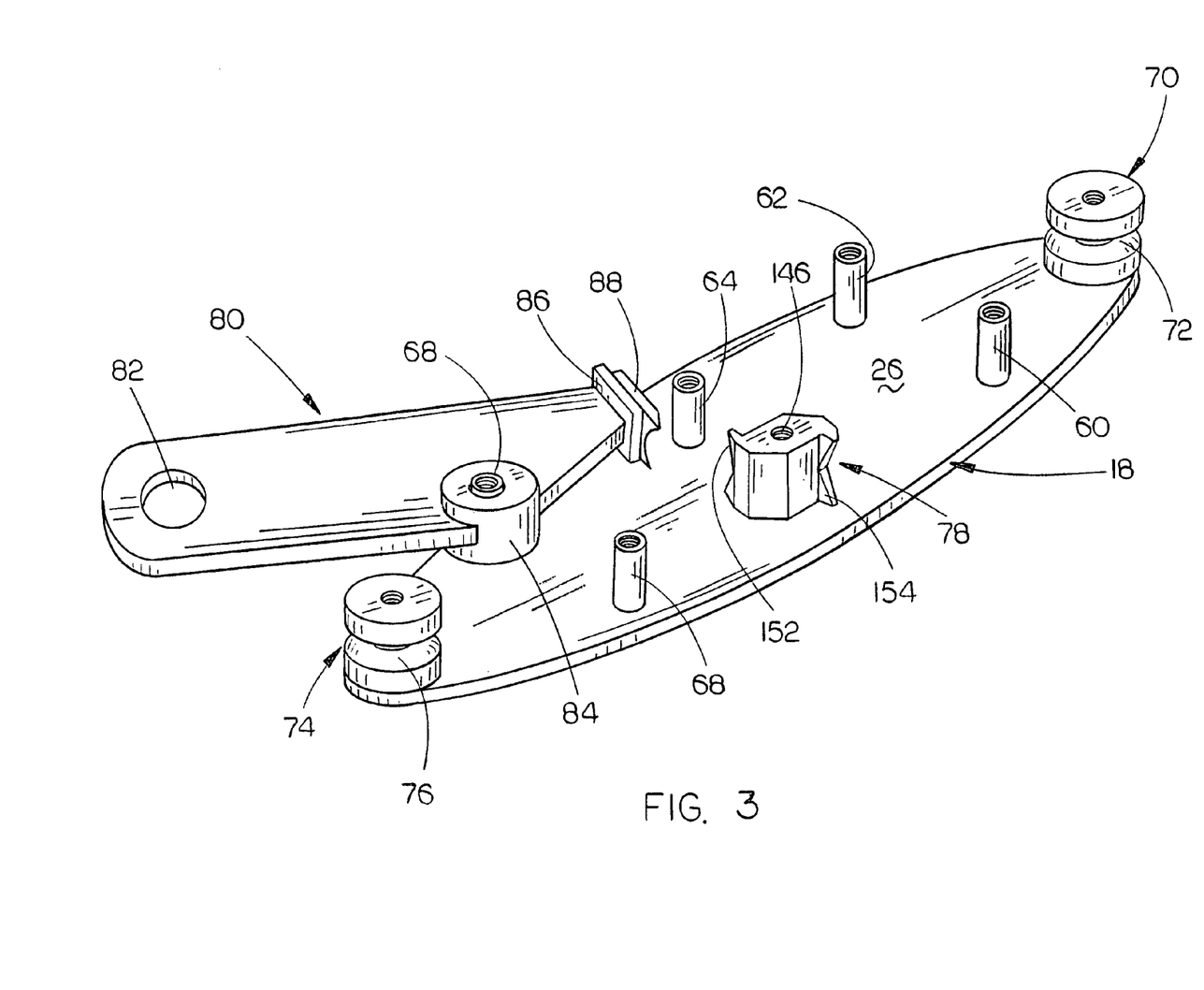
FIG. 3 is an inside perspective view of the first side plate having the line guides, spacers, anvil and actuator lever secured thereto.

The numerals 60, 62, 64, 66, 68 and 69 refer to tubular spacers constructed of stainless steel or the like and which have internally threaded portions at the opposite ends thereof. One end of spacer 60 threadably receives screw 46 with one end of spacer 62 threadably receiving screw 48. One end of spacer 64 threadably receives screw 52 and one end of spacer 66 threadably receives screw 54. One end of spacer 68 threadably receives screw 56.

The numeral 70 refers to a line guide which is mounted at the inner side of opening 28 in plate 18. Screw 44 is screwed into the side of line guide 70. Line guide 70 has a V-shaped groove 72 formed therein. Line guide 74 is mounted at the inner side of opening 42 in plate 18 with screw 58 screwed into the side of line guide 74. Line guide 74 has a V-shaped groove 76 formed therein. The numeral 78 refers to an anvil which is positioned at the inner side of opening 34 with screw 50 being threadably secured to one side of anvil 78. The details of anvil 78 will be described in more detail hereinafter.

Figure 4:
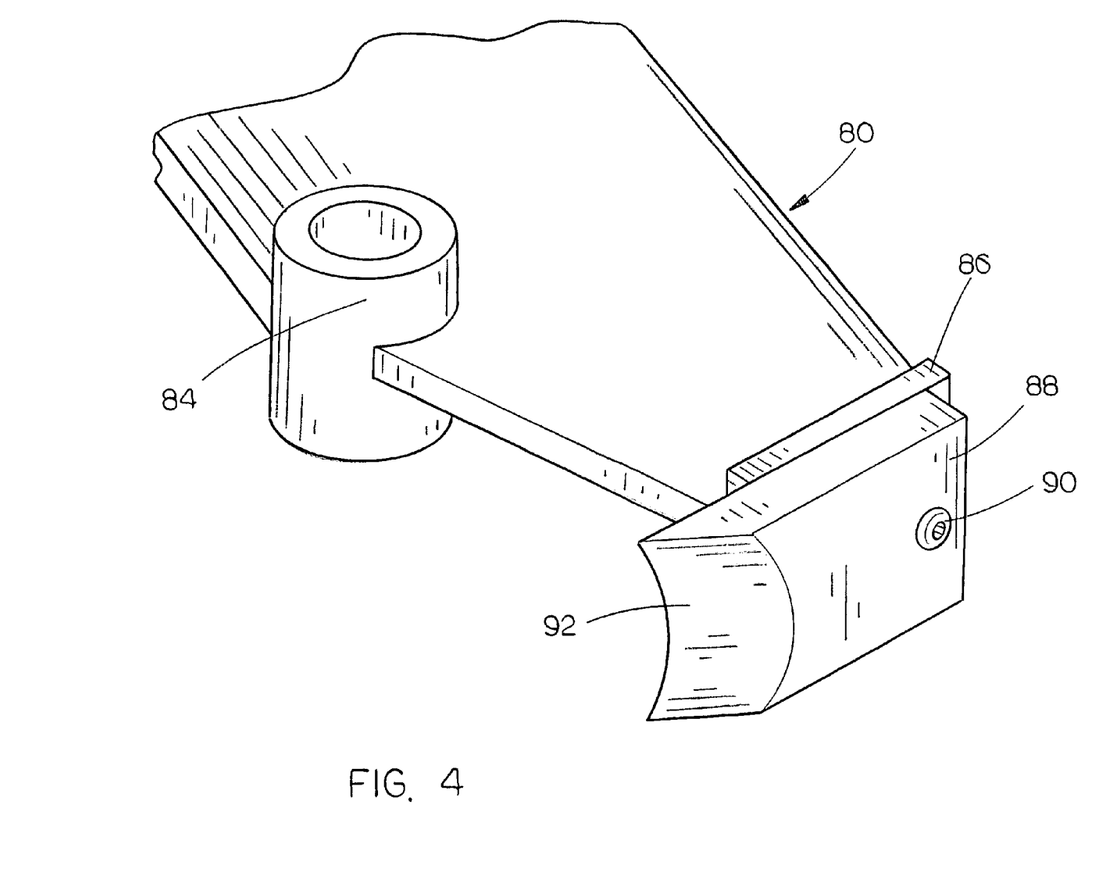
FIG. 4 is a partial perspective view of the cutting blade of this invention mounted on the upper end of the actuator lever.
Figure 5:
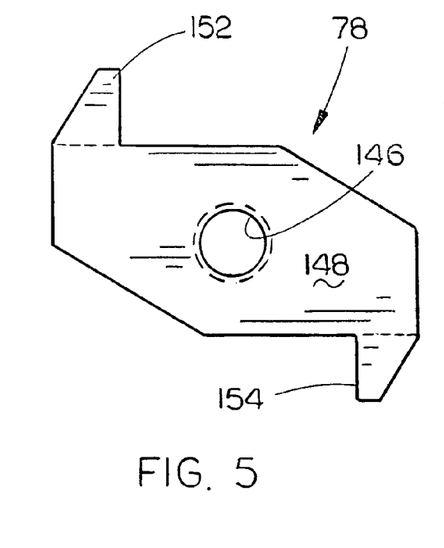
FIG. 5 is a side elevational view of the anvil of this invention.
Figure 6:
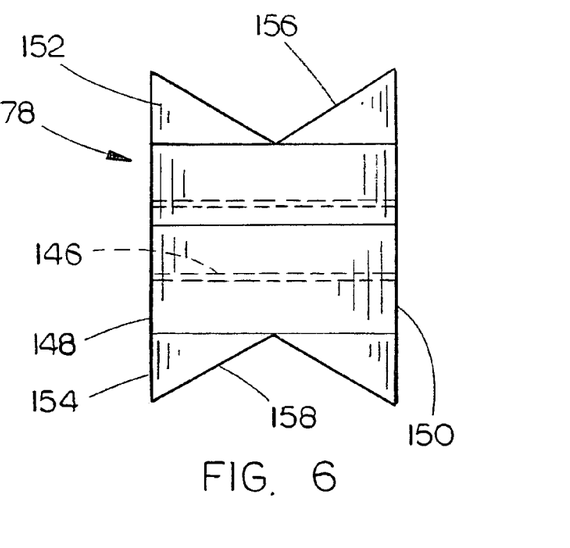
FIG. 6 is an end elevational view of the anvil of FIG. 5.
Figure 7:
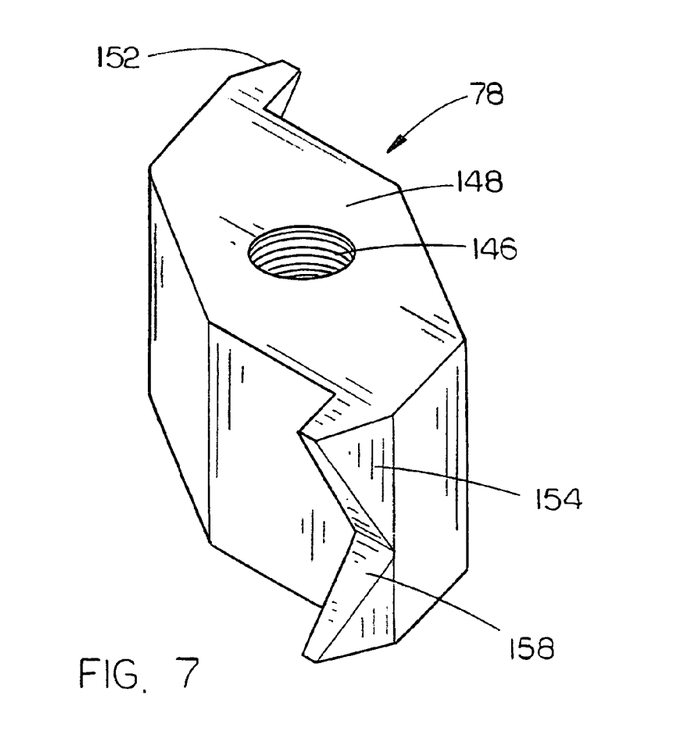
FIG. 7 is a perspective view of the anvil of FIG. 5.

The numeral 80 refers to an actuator lever having an opening 82 at one, end thereof. Lever 80 has a cylindrical hub portion 84 secured thereto intermediate the length thereof which is rotatably mounted on spacer 68. A blade support 86 is secured to the upper end of actuator lever 80 and has a cutting blade 88 secured thereto by screw 90. The inner end of blade 88 has a tapered and U-shaped cutting edge 92 formed therein.

Figure 8:
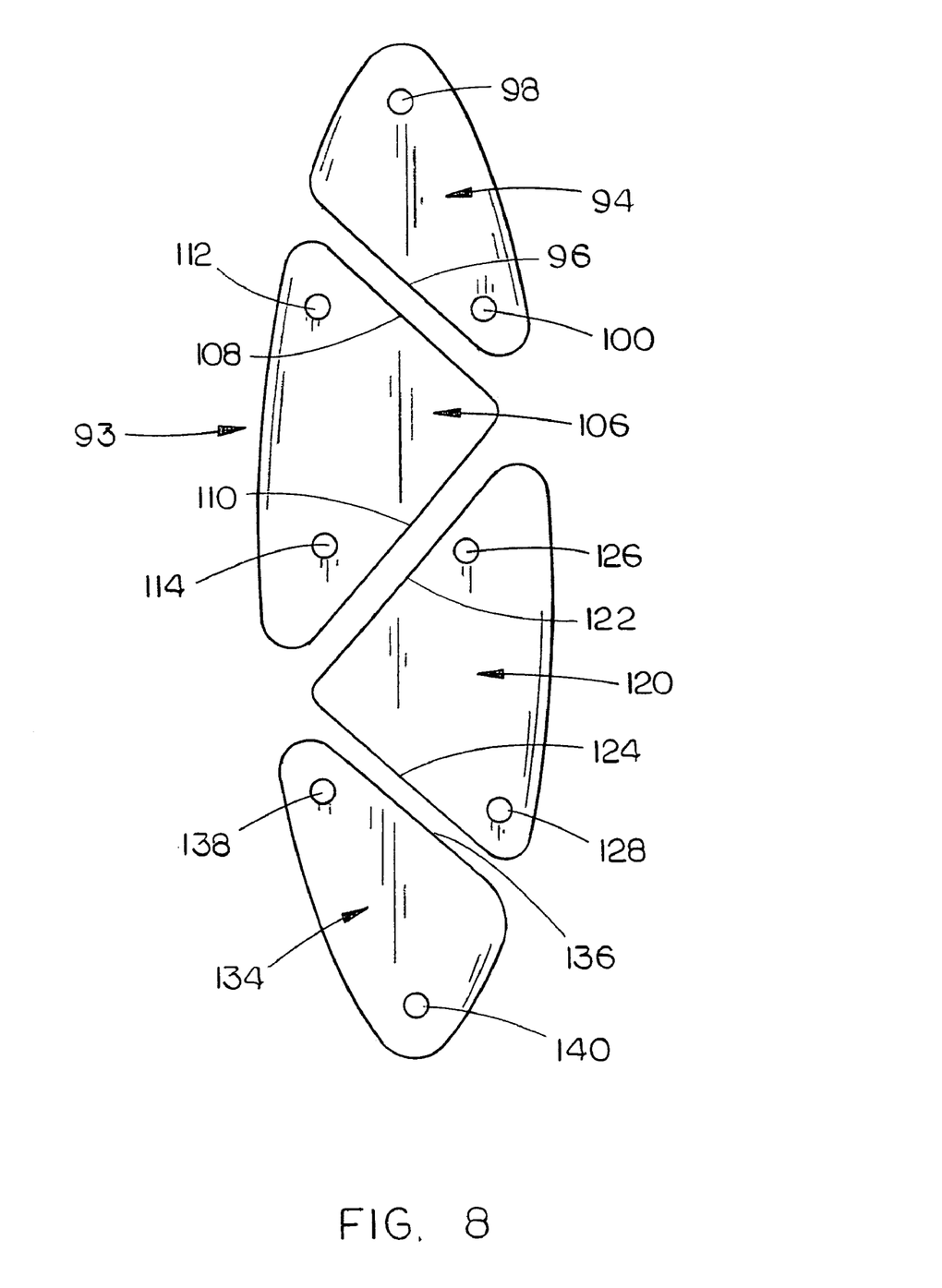
FIG. 8 is a side view of the side plate members of the side plate apparatus.
Figure 9:
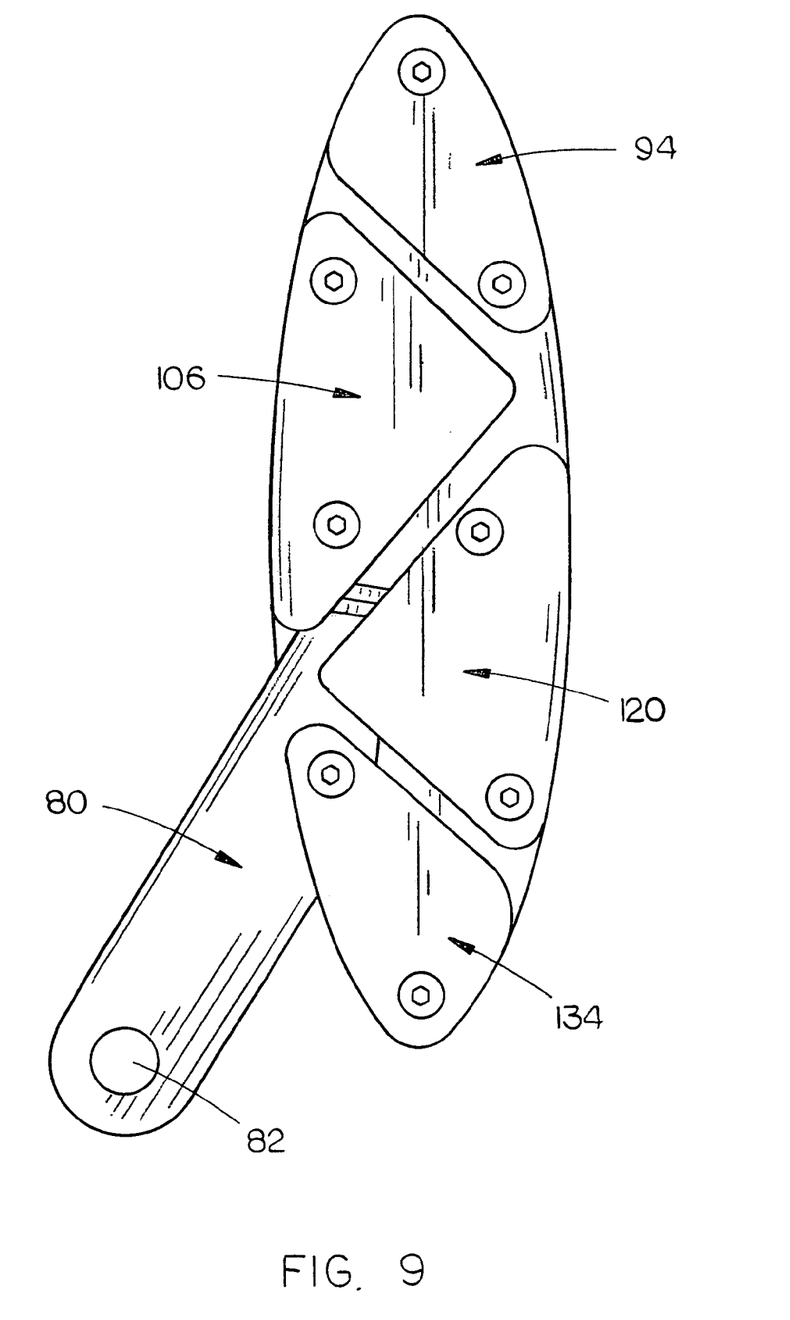
FIG. 9 is a view similar to FIG. 8 except that the side plate members have been secured in place.

The numeral 93 refers to a side plate assembly which is comprised of four plate members as will now be described. The numeral 94 refers to a generally triangular-shaped plate member having a diagonally extending lower edge 96. Plate member 94 is provided with openings 98 and 100 formed therein. The upper end of plate member 94 is screwed to line guide 70 by means of screw 102 extending through opening 96 in plate member 94 and being threadably received by an internally threaded bore in the side of line guide 70. The lower end of plate member 94 is secured to spacer 60 by means of screw 104.

The numeral 106 refers to a generally triangular-shaped plate member having a diagonally extending upper edge 108 and a diagonally extending lower edge 110. Plate member 106 includes an opening 112 at its upper end and an opening 114 at its lower end. The upper end of plate member 106 is secured to spacer 62 by means of screw 116 extending through opening 112 and being threadably received by the end of spacer 62. The lower end of plate member 106 is secured to spacer 64 by screw 118 extending through opening 114 in plate member 106 and being threadably received by spacer 64.

The numeral 120 refers to a generally triangular-shaped plate member having a diagonally extending upper edge 122 and a diagonally extending lower edge 124. Plate member 120 has an opening 126 formed in its upper end and an opening 128 formed in its lower end. Plate member 120 is secured at its upper end to anvil 78 by means of screw 130 extending through opening 126 and into the side of anvil 78. The lower end of plate member 120 is secured to spacer 68 by means of screw 132 extending through opening 128 and being threadably received by the end of spacer 68.

The numeral 134 refers to a generally triangular-shaped plate member having a diagonally extending upper edge 136, an opening 138 at its upper end and an opening 140 at its lower end. The upper end of plate member 134 is secured to spacer 68 by screw 142 extending through opening 138 and being threadably received by the end of spacer 68. The lower end of plate member 134 is secured to line guide 74 by means of screw 144 extending through opening 140 in plate member 134 and being threadably secured to one side of line guide 74.

As seen in the drawings, the lower edge 96 of plate member 94 is parallel to and spaced from the upper edge 108 of plate member 106. As also seen in the drawings, the lower edge 110 of plate member 106 is parallel to and spaced from the upper edge 122 of plate member 120. Further, it can be seen from the drawings that the lower edge 124 of plate member 120 is parallel to and spaced from the upper edge 136 of plate member 134. Plate members 94, 106, 120 and 134 are flat in configuration and are preferably constructed of a stainless steel material as are the screws which secure the plate members 94, 106, 120 and 134 in place.

Figure 11:
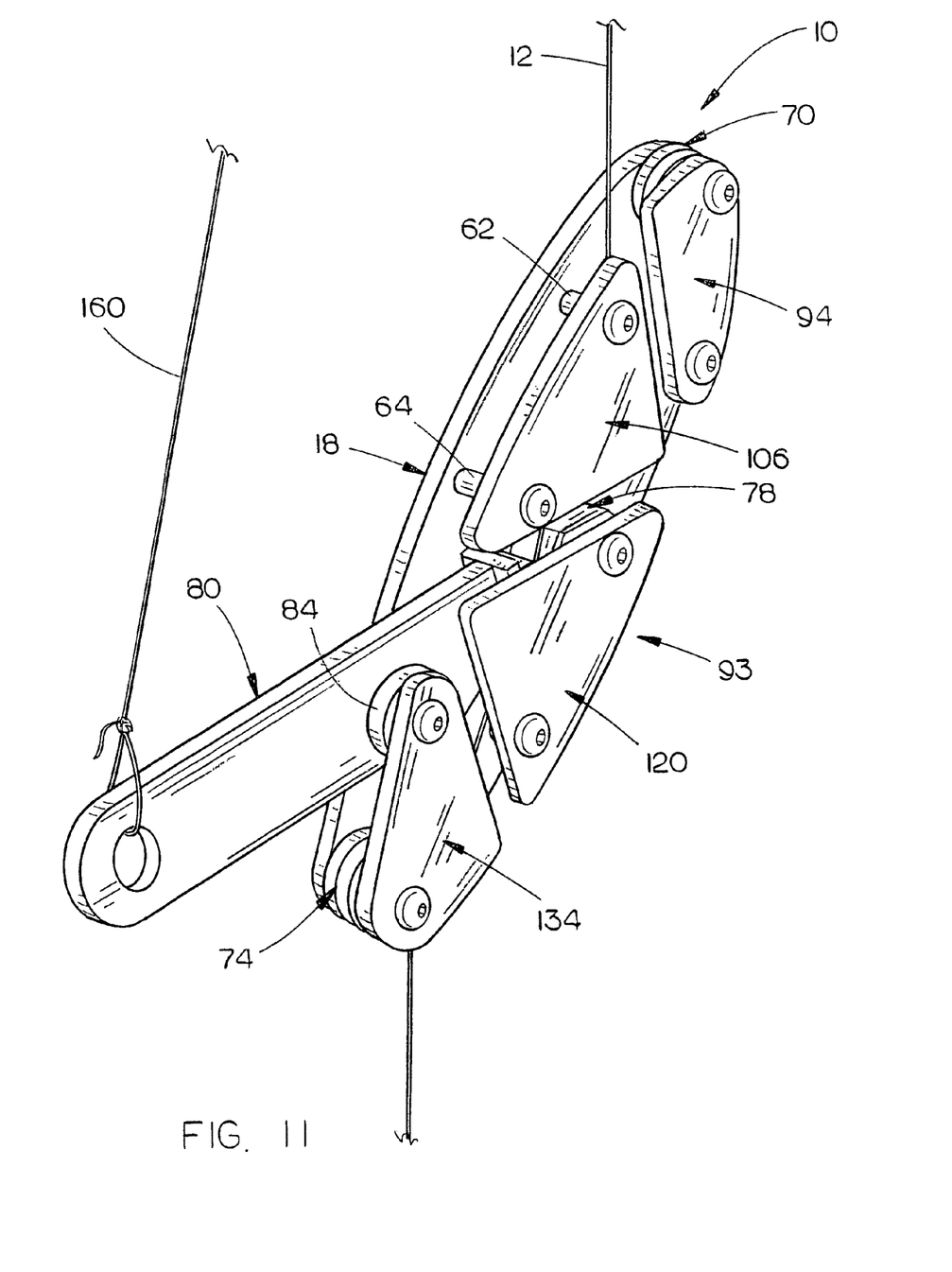
FIG. 11 is a perspective view illustrating the actuator lever being pivoted by means of the tag line and which shows the compound cutting action achieved by the fishing line cutter.

Anvil 76 is selectively reversibly mounted at the inner side of plate 18 and includes a central internally threaded bore 146 extending between the sides 148 and 150 thereof. A pair of oppositely extending anvil members 152 and 154 are provided at the ends of anvil 76 and have V-shaped notches 156 and 158 formed therein respectively. The anvil 76 is selectively rotatably mounted so that either the anvil members 152 or the anvil members 154 face inwardly. Tag line 160 is secured to actuator lever 80 as seen in FIG. 11.

Figure 10:
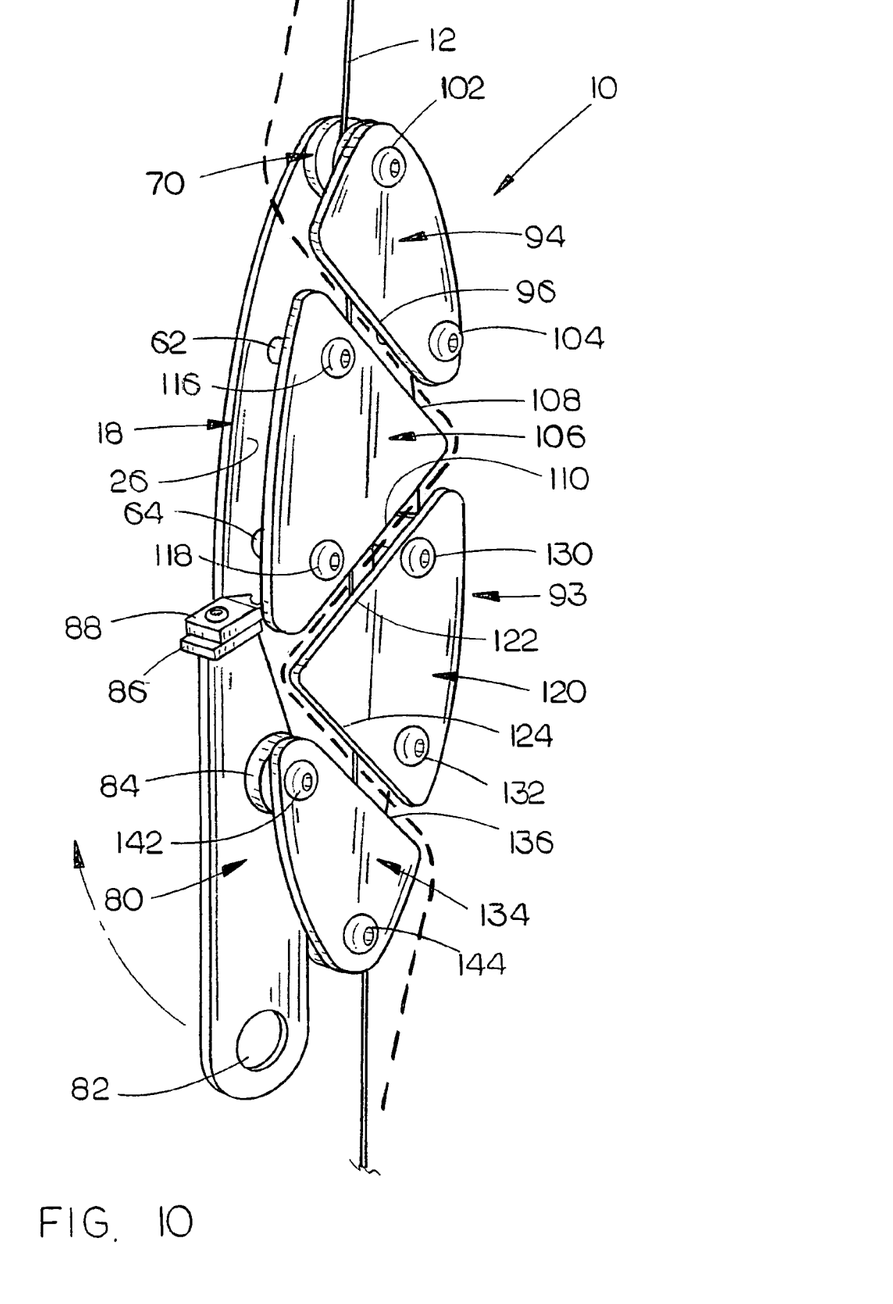
FIG. 10 is a perspective view of the fishing line cutter of this invention showing the manner in which the line to be cut is threaded into the fishing line cutter.

The fishing line cutter of this invention is used as follows. The fishing line 12 to be cut will be grasped and extended around the left side of line guide 70 (as viewed in FIG. 10) and moved inwardly through the slot formed by lower edge 96 of plate member 94 and upper edge 108 of plate member 106 so as to pass between the spacers 62 and 60. The line 12 will then be threaded inwardly between lower edge 110 of plate member 106 and the upper edge 122 of plate member 120 so as to pass between anvil 78 and spacer 64. The line 12 is then threaded inwardly between the lower edge 124 of plate member 120 and the upper edge 136 of plate member 134 between spacer 66 and the hub 84 of actuator lever 80. The line 12 is then passed over the upper and right sides of line guide 74. The line 12 is then "trapped" between the first side plate 18 and the side plate apparatus 93.

When the line 12 is extended through the line cutter 10, the line 12 will be partially received by the V-shaped notch 156 in anvil 78, which assists in centering the line 12 in line cutter 10. The peripheral grooves 72 and 76 in line guides 70 and 74 respectively maintain the line 12 centrally between the first side plate 18 and the side plate assembly 93. When it is desired to cut the line 12 near the hook on the lower end of the line 12, the line cutter 10 is allowed to move downwardly on line 12 by gravity while the tag line 160 is allowed to freely follow the line cutter 10. When the line cutter 10 has reached the vicinity of the hook, the tag line 160 is pulled upwardly which causes the lever 80 to pivot about spacer 68 which causes the cutting blade 88 to be moved inwardly into engagement with the line 12 with the tapered and U-shaped cutting edge 92 receiving the line 12 to sever the line 12. As the tag line 160 pivots the actuating lever 80, a compound pivoting action is achieved to enhance the cutting action of the cutting edge 92 since the line cutter 10 also tends to pivot in a clockwise direction as seen in FIG. 11. When the line 12 has been severed, the tag line 160 is used to raise the line cutter 10 from the water to enable the line cutter 10 to be retrieved.

Thus it can be seen that a fishing line cutter has been provided which enables the fishing line 12 to be severed near the hook on the fishing line 12 so that only a very short length of fishing line is left attached to the hook. It can also be seen that the line cutter 10 may be quickly and easily mounted on the fishing line 12 without any disassembly of the line cutter 10 and without the fishing line 12 being cut so as to enable the fishing line 12 to be threaded into the line cutter 10. Thus it can be seen that the fishing line cutter of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A fishing line cutter for cutting a fishing line, comprising:
   a first side plate having an upper end, a lower end, a first side edge, a second side edge, an inner surface and an outer surface;
   an upper line guide secured to said first side plate at said inner surface thereof adjacent said upper end thereof;
   a lower line guide secured to said first side plate at said inner surface thereof adjacent said lower end thereof;
   said first side plate having a plurality of vertically and horizontally spaced-apart spacers secured thereto which extend inwardly from said inner surface thereof;
   an anvil secured to said first side plate at said inner surface thereof between said upper and lower ends thereof;
   an actuator lever having upper and lower ends;
   said actuator lever having a cutting blade secured to its said upper end;
   said actuator lever being pivotally secured, intermediate its said upper and lower ends, to said first side plate at said inner surface thereof above said lower end thereof;
   said actuator lever being selectively pivotally movable between a first non-cutting position towards a second cutting position whereby said cutting blade will pass beneath said anvil as it is moved from its said first non-cutting position towards its said second cutting position; and
   a vertically disposed side plate assembly, having upper and lower ends, secured to said first side plate in a spaced-apart relationship thereto;
   said side plate assembly being secured to said spacers, said anvil and said upper and lower line guides;
   said actuator lever also being pivotally secured to said side plate assembly;
   said side plate assembly being comprised of a plurality of generally triangular-shaped side plate members which are spaced-apart from one another to permit the fishing line to be initially inserted between said first side plate and said side plate assembly without disassembling said first side plate and said side plate assembly and without cutting the fishing line while inserting said fishing line between said first side plate and said side plate assembly.

2. The fishing line cutter of claim 1 wherein said side plate assembly includes first, second, third and fourth side plate members.

3. The fishing line cutter of claim 2 wherein said first side plate member has an upper end which is secured to said upper line guide and has a lower end which is secured to one of said spacers which are secured to said first side plate, said first side plate member having a diagonally extending lower edge, with upper and lower end, said second side plate member having an upper end which is secured to one of said spacers and has a lower end which is secured to one of said spacers, said second side plate member having a diagonally extending upper edge with upper and lower ends, said upper edge of said second side plate being spaced from and parallel to said lower edge of said first side plate member, said second side plate member having a diagonally extending lower edge with upper and lower ends; said third side plate member having an upper end which is secured to said anvil and a lower end which is secured to one of said spacers, said third side plate member having a diagonally extending upper edge with upper and lower ends, said upper edge of said third side plate member being spaced from and parallel to said lower edge of said second side plate member, said third side plate member having a diagonally extending lower edge with upper and lower ends, said upper side plate member having an upper end which operatively pivotally supports said actuator lever and a lower end which is secured to said lower line guide, said fourth side plate member having a diagonally extending upper edge with upper and lower ends, said upper edge of said fourth side plate member being spaced from and parallel to said lower edge of said third side plate member.

4. The fishing line cutter of claim 3 wherein one of said spacers, which are secured to said first side plate, has said actuator lever pivotally mounted thereon.

5. The fishing line cutter of claim 1 wherein said cutting blade has a U-shaped and beveled cutting edge.

6. The fishing line cutter of claim 1 wherein said anvil is reversible.

7. The fishing line cutter of claim 1 wherein said cutting blade is selectively removably secured to said actuator lever.

8. The fishing line cutter of claim 1 wherein said first side plate is generally oval in shape.

9. The fishing line cutter of claim 8 wherein said side plate assembly defines a generally oval shape.

10. The fishing line cutter of claim 1 wherein said anvil has an anvil member which has a generally V-shaped notch formed therein which partially receives the fishing line.

11. The fishing line cutter of claim 10 wherein said anvil has a pair of oppositely extending anvil members each of which have a generally V-shaped notch formed therein so that said anvil is reversible.

* * * * *